United States Patent
Fischer et al.

[11] Patent Number: 6,032,535
[45] Date of Patent: Mar. 7, 2000

[54] ARRANGEMENT FOR MAKING CONTACTLESS DISTANCE AND PRESSURE MEASUREMENTS WITHIN AN AIR SPRING

[75] Inventors: Norbert Fischer, Sehnde; Roland Altsinger, Burgdorf, both of Germany

[73] Assignee: Contitech Luftfedersystem GmbH, Hannover, Germany

[21] Appl. No.: 09/006,442

[22] Filed: Jan. 13, 1998

[30] Foreign Application Priority Data

Jan. 14, 1997 [DE] Germany ............................ 197 00 966

[51] Int. Cl.⁷ ............................ B60G 17/04; B60G 17/08
[52] U.S. Cl. ............................ 73/629; 73/618; 73/632; 267/64.19
[58] Field of Search ............................ 73/290 V, 597, 73/627, 629, 862.581, 862.59, 862.621, 862.625; 267/256, 64.11, 64.19, 64.28; 280/5.5, 5.514, 5.515, 6.15, 6.157, 6.159, 124.157, 124.158, 124.159; 340/614, 626; 367/902, 908; 356/4.01, 4.08

[56] References Cited

U.S. PATENT DOCUMENTS

| | | | |
|---|---|---|---|
| 2,743,429 | 4/1956 | Erdman et al. | 340/1 |
| 4,543,649 | 9/1985 | Head et al. | 367/96 |
| 4,561,064 | 12/1985 | Brüggen et al. | 364/561 |
| 4,798,369 | 1/1989 | Geno et al. | 267/64.11 |
| 4,938,066 | 7/1990 | Dorr | 73/597 |
| 5,859,692 | 1/1999 | Ross, Jr. et al. | 356/4.01 |
| 5,936,161 | 8/1999 | Fischer | 73/632 |

FOREIGN PATENT DOCUMENTS

| | | |
|---|---|---|
| 3423602 | 1/1986 | Germany . |
| 3620957 | 1/1987 | Germany . |
| 8702817 | 6/1987 | Germany . |

*Primary Examiner*—Hezron Williams
*Assistant Examiner*—Rose M. Miller
*Attorney, Agent, or Firm*—Walter Ottesen

[57] ABSTRACT

The invention is directed to an arrangement for making contactless distance and pressure measurements within an air spring. With a single arrangement, the exact elevation of the spring as well as the spring pressure can be determined. This permits optimal utilization of the axle loads of a multi-axle vehicle and permits adjustment of the distance between the chassis and the axle. In the arrangement, an ultrasonic configuration makes contactless distance measurements in accordance with the pulse/echo method. The arrangement includes a transmitter/receiver component (4) mounted on the chassis and a first reflector (24) defining a first reference distance (16) therebetween. The component (4) and a reflector (6) define a measuring distance (30). The reflector (6) is fixedly mounted to the axle. The transmitter/receiver component (4) is elastically supported by a suspension (10) in a pipe stub (8) fixedly mounted to the chassis. A second reflector (28) is fixedly mounted on the pipe stub (8) and defines a second reference distance (18) to the component (4). The displacement of the elastically-supported component (4), which is caused by the internal pressure, is given by a comparison of the propagation times assigned to the two reference distances (16 and 18). In this way, the internal pressure of the air spring is determined.

2 Claims, 1 Drawing Sheet

ARRANGEMENT FOR MAKING
CONTACTLESS DISTANCE AND PRESSURE
MEASUREMENTS WITHIN AN AIR SPRING

FIELD OF THE INVENTION

The invention relates to an arrangement for making contactless distance and pressure measurements within an air spring of a motor vehicle.

BACKGROUND OF THE INVENTION

The distance between chassis and axle should not change for different loading states of the vehicle. For this reason, it is necessary to measure the height of the spring and to readjust the system by pumping or releasing air when there are deviations from the desired height. An air spring control is also required for optimal utilization of the axle load of a multi-axle vehicle.

Ultrasonic distance measurement in air is, for example, utilized for making fill-level measurements of vessels, to measure rooms of a dwelling, to make distance measurements when parking a motor vehicle, to make distance measurements in automatic focus cameras and the like.

German patent publication 3,423,602 discloses an arrangement for measuring the distance between the chassis and the axle of a vehicle utilizing an ultrasonic measuring system configured as a transmitter/receiver.

The advantage of utilizing ultrasonic sound within an air spring is that no turbulence of sound waves caused by the wind created by the movement of the vehicle is possible within the air spring.

On the other hand, the problem is present when making distance measurement within the air spring chamber that, in the air springs, pressure differences between 0 and approximately 20 bar and temperature ranges between −40° C. and +120° C. must be mastered. The speed of sound in a real gas, such as pumped-in air, is dependent to a great extent on pressure and temperature. For this reason, considerable errors result when basing the distance computation on a fixed pregiven speed of sound.

To avoid such errors, U.S. Pat. No. 4,798,369 discloses an ultrasonic air spring system wherein a compensation of the pressure and temperature dependency is provided by means of a computer circuit.

German patent publication 3,620,957 discloses an air spring having an ultrasonic pulse/echo system for making height measurements. An additional fixed target is proposed in order to cancel the effects of the changes in propagation speed of the pulses (the changes in propagation speed can occur because of air pressure, temperature and humidity changes in the interior of the resilient member of the air spring). In this way, a relative value for the propagation times is determined. It is not necessary to know the instantaneous speed of the sound to compute the vehicle elevation in this relative method.

The disadvantage with such a relative method while utilizing a reference distance (such a method is known in a comparable manner also for a telescope shock absorber as disclosed in German utility model registration G 87 02 817.4) is that the important variables of pressure and temperature cannot be explicitly displayed. The above-mentioned German utility model registration G 87 02 817.4 only discloses installing thermistors to compensate for temperature.

The spring pressure, which is of interest for the state of loading of the vehicle, the wheel load and the like, cannot be determined with any of the above-mentioned air spring measuring arrangements.

SUMMARY OF THE INVENTION

It is an object of the invention to provide an ultrasonic pulse/echo measuring system wherein the exact height of the spring as well as the pressure thereof are explicitly given with a single device.

The arrangement of the invention is for contactlessly making measurements of distance and pressure within an air spring of a motor vehicle. The air spring is delimited by a first part fixedly connected to the chassis of the motor vehicle and a second part fixedly connected to the axle of a wheel of the motor vehicle. The first and second parts are movable relative to each other causing the distance therebetween to vary. The arrangement includes: a transmitter/receiver assembly associated with the first part; the transmitter/receiver assembly including: a support structure fixedly mounted on the first part; an ultrasonic transmitter/receiver unit and a first reflector conjointly defining a first reference distance therebetween; an elastic mount for elastically suspending the ultrasonic transmitter/receiver unit and the first reflector in the support structure and the elastic mount being subject to a displacement in response to the pressure; a second reflector fixedly mounted on the support structure; the ultrasonic transmitter/receiver unit and the second reflector conjointly defining a second reference distance therebetween; a third reflector fixedly disposed on the second part; the third reflector and the ultrasonic transmitter/receiver unit conjointly defining a measuring distance therebetween; the elastic mount having a characteristic line defining the pressure as a function of the displacement of the mount in response to the pressure; and, the characteristic line being a first variable and the second reference distance being a second variable from which variables the pressure can be determined.

Pressure pick-ups, which operate on a strain gauge basis, or piezoelectric pick-ups are used in diverse areas of application. The second reference distance is a feature of the invention and coacts with an elastic suspension of the transducer. With this combination, it is possible for the first time, to determine with a single device the pressure parameter simultaneously with the spring elevation.

Preferably, the first reflector is defined by a first wire bracket and the second reflector is defined by a second wire bracket. The wire bracket reflectors according to the invention have a greater stability compared to a target in the form of a planar metal disc attached to a stem. This is especially significant for rough driving operations. Reflectors made of wire are especially simple and inexpensive to produce.

The data of interest, namely, vehicle elevation and spring pressure, are determined with the aid of a computer element from the measured pressure-dependent length of the second reference distance in combination with the known pressure/displacement characteristic of the suspension.

BRIEF DESCRIPTION OF THE DRAWING

The invention will now be described with reference to the drawing wherein.

DESCRIPTION OF THE PREFERRED EMBODIMENTS OF THE INVENTION

Figure 1:
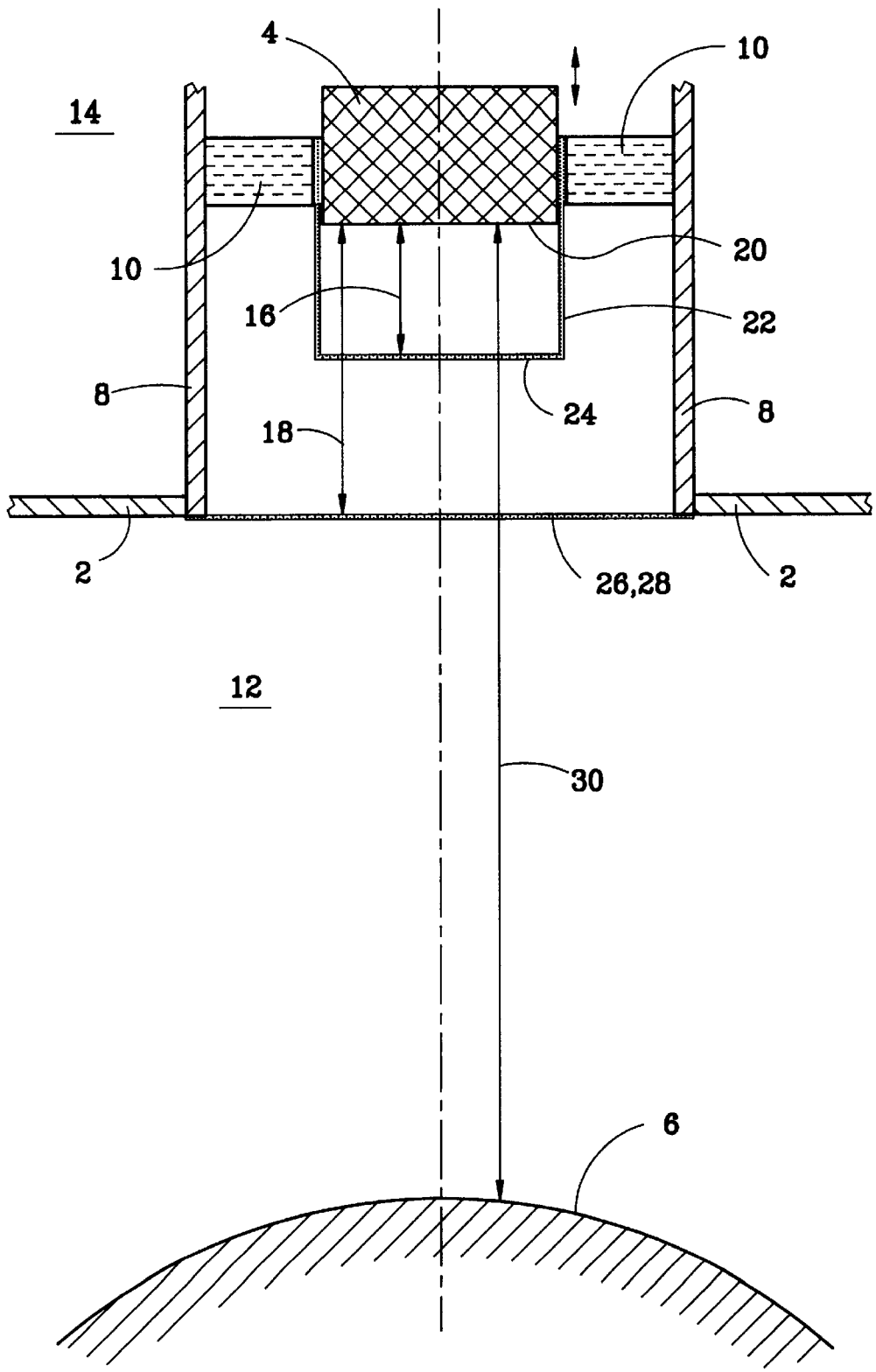
FIG. 1 is a schematic showing the arrangement according to the invention for making contactless distance and pressure measurements within an air spring. The schematic shows a converter element elastically built into the cover plate of the air spring as well as first and second reference distances.

An air spring essentially comprises a cover plate 2 which is attached to the vehicle frame or chassis, a flexible member and a roll-off piston attached at the wheel end or to the axle. With the aid of the resilient member, the roll-off piston can move relative to the cover plate 2.

An ultrasonic measuring system is disposed within the air spring in order to determine the vehicle elevation which is dependent upon the particular loading state and spring deflection. The measuring system operates pursuant to the pulse/echo method. For this purpose, a piezoelectric transducer 4 operates as an ultrasonic pulse transmitter and receiver and is mounted on the cover plate 2. A reflector 6 or a surface suitable for reflection is disposed on the end of the roll-off piston lying opposite the ultrasonic transducer 4.

In the embodiment shown, the cover plate 2 includes a pipe-shaped stub 8. The ultrasonic transducer 4 is disposed in the pipe-shaped stub 8. This ultrasonic transducer 4 is elastically suspended. The elastic suspension 10 defines an air-tight closure of the interior space 12 of the spring relative to the ambient 14. The elastic suspension or mount 10 exhibits a specific pressure/displacement characteristic.

Also shown in FIG. 1 is a first reference distance 16 and a second reference distance 18. The first reference distance 16 extends from the surface 20 of the transducer 4 to a first reflector 24. The reflector 24 is rigidly connected to the transducer 4 and is configured as a first wire bracket 22. The second reference distance 18 likewise begins at the surface 20 and extends to a second reflector 28. The second reflector 28 is configured as a second wire bracket 26 and is rigidly connected to the cover plate 2, more specifically, to the pipe stub 8.

In addition to the reference distances 16 and 18, a measuring distance 30, which is known from the state of the art, is provided between the surface 20 of the transducer and the reflector 6 fixedly attached to the roll-off piston.

The operation of the measuring arrangement according to the invention will now be described.

The spring height can be determined in the conventional manner without knowledge of the sound speed from the ratio of the propagation time across measurement distance 30 to the propagation time across reference distance 16.

In addition, and according to the invention, the instantaneous pressure present in the interior 12 of the spring is determined from the pulse/echo signals of the first and second reference distances (16 and 18). The displacement of the elastically-supported sonic transducer 4, which is caused by the internal pressure, is provided by a comparison of the two propagation times. Elastic displacement and the pressure/displacement characteristic line of the elastic support 10 are, in turn, a measure for the internal pressure of the air spring.

The knowledge of the pressure, which is instantaneously present in the air spring, serves, for example, as a basis for computing the loading state or the particular wheel load.

An electronic circuit appropriate for performing the computations referred to above is described with reference to FIG. 3 of U.S. patent application Ser. No. 08/976,426, filed on Nov. 21, 1997, and incorporated herein by reference.

It is understood that the foregoing description is that of the preferred embodiments of the invention and that various changes and modifications may be made thereto without departing from the spirit and scope of the invention as defined in the appended claims.

What is claimed is:

1. An arrangement for contactlessly making measurements of distance and pressure within an air spring of a motor vehicle, the air spring being delimited by a first part fixedly connected to the chassis of said motor vehicle and a second part fixedly connected to the axle of a wheel of said motor vehicle, said first and second parts being movable relative to each other causing the distance therebetween to vary, the arrangement comprising:

a transmitter/receiver assembly associated with said first part;

said transmitter/receiver assembly including:

a support structure fixedly mounted on said first part;

an ultrasonic transmitter/receiver unit and a first reflector conjointly defining a first reference distance therebetween;

an elastic mount for elastically suspending said ultrasonic transmitter/receiver unit and said first reflector in said support structure and said elastic mount being subject to a displacement in response to said pressure;

a second reflector fixedly mounted on said support structure;

said ultrasonic transmitter/receiver unit and said second reflector conjointly defining a second reference distance therebetween;

a third reflector fixedly disposed on said second part;

said third reflector and said ultrasonic transmitter/receiver unit conjointly defining a measuring distance therebetween;

said elastic mount having a characteristic line defining said pressure as a function of said displacement of said mount in response to said pressure; and, said characteristic line being a first variable and said second reference distance being a second variable from which variables said pressure can be determined.

2. The arrangement of claim 1, wherein said first reflector is a first wire bracket and said second reflector is a second wire bracket.

* * * * *